United States Patent
Cass et al.

(10) Patent No.: US 10,707,672 B2
(45) Date of Patent: Jul. 7, 2020

(54) METHODS AND APPARATUS FOR BATTERY CURRENT MONITORING

(71) Applicant: Intel Corporation, Santa Clara, CA (US)

(72) Inventors: Devin Cass, San Francisco, CA (US); Jorge Zabaco, San Diego, CA (US); George D. Beckstein, III, Angola, NY (US)

(73) Assignee: INTEL CORPORATION, Santa Clara, CA (US)

( * ) Notice: Subject to any disclaimer, the term of this patent is extended or adjusted under 35 U.S.C. 154(b) by 568 days.

(21) Appl. No.: 15/587,111

(22) Filed: May 4, 2017

(65) Prior Publication Data

US 2018/0323607 A1    Nov. 8, 2018

(51) Int. Cl.
   *H02H 3/093*    (2006.01)
   *H02H 3/087*    (2006.01)

(52) U.S. Cl.
   CPC ............ *H02H 3/093* (2013.01); *H02H 3/087* (2013.01)

(58) Field of Classification Search
   CPC ........... H02H 3/087; H02H 3/093; H02H 7/20
   USPC .............................................. 361/93.7
   See application file for complete search history.

(56) References Cited

U.S. PATENT DOCUMENTS

| | | | |
|---|---|---|---|
| 4,494,162 A * | 1/1985 | Eyler | F02N 11/10 123/179.1 |
| 5,451,881 A | 9/1995 | Finger | |
| 5,648,717 A | 7/1997 | Uskali | |
| 6,347,028 B1 | 2/2002 | Hausman, Jr. et al. | |
| 6,631,066 B1 * | 10/2003 | Smith | G05F 1/613 361/103 |
| 6,879,133 B1 | 4/2005 | Geren | |
| 8,532,946 B2 | 9/2013 | Benckenstein, Jr. et al. | |
| 2015/0345985 A1 * | 12/2015 | Fung | G16H 40/63 702/160 |
| 2017/0271920 A1 * | 9/2017 | Kim | H02J 50/10 |
| 2017/0366035 A1 * | 12/2017 | Meng | H02J 7/0029 |

* cited by examiner

*Primary Examiner* — Kevin J Comber
(74) *Attorney, Agent, or Firm* — Hanley, Flight & Zimmerman, LLC

(57) ABSTRACT

Methods and apparatus are disclosed for battery current monitoring. A current controller can prevent injury from a battery operated wearable device. An isolation switch can interrupt delivery of current of a battery to a load in response to an isolation switch control signal to prevent burn injury to a wearer of the battery operated wearable device. The battery operated wearable device can be wrist wearable or head wearable.

20 Claims, 6 Drawing Sheets

METHODS AND APPARATUS FOR BATTERY CURRENT MONITORING

FIELD OF THE DISCLOSURE

This disclosure relates to monitoring, and in particular, to methods and apparatus for battery current monitoring.

BACKGROUND

Wearable devices such as wrist wearable computing devices and head wearable devices (e.g., virtual reality headsets) can provide enhancements to user experiences in new ways. For example, virtual reality headsets can provide for user interaction, as part of those experiences. In particular, head mounted displays can be a convenient way for users to gain access to these new experiences. Similarly, wrist wearable computing devices can provide users with convenient access to experiences and/or information. However, some improvements may be needed, since wearable devices such as wrist wearable devices, head wearable devices and/or the like can come in close contact with users.

DETAILED DESCRIPTION

Figure 1:
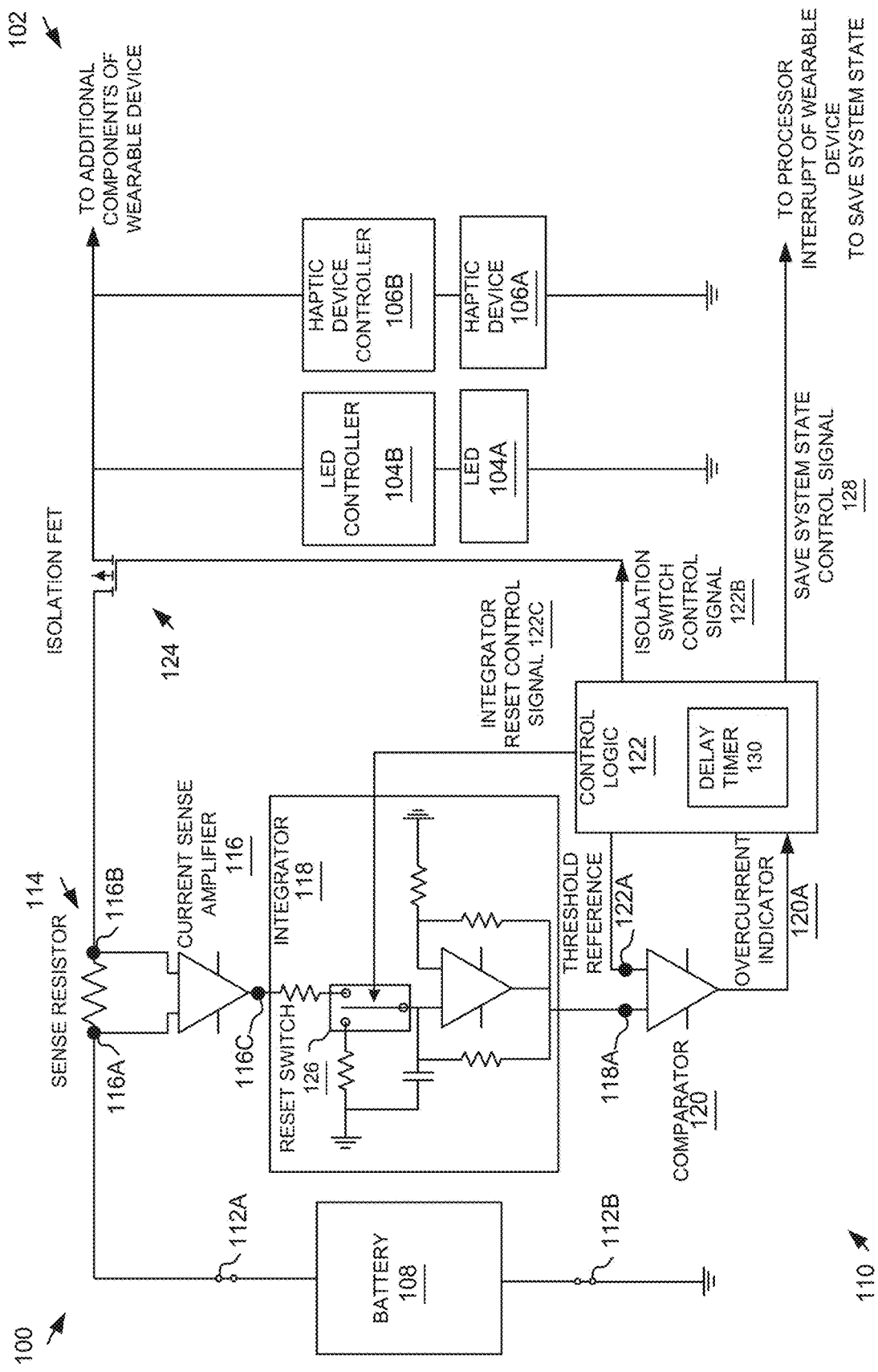
FIG. 1 is a circuit diagram of an example system for battery current monitoring in a wearable device.

FIG. 1 is a circuit diagram of an example system 100 constructed in accordance with teachings of this disclosure for battery current monitoring in a battery operated wearable device 102. The battery operated wearable device 102 can include a light emitting diode (LED) 104A and a light emitting diode (LED) controller 104B coupled with the LED 104A to control operation of the LED 104A. The battery operated wearable device 102 can also include a haptic device 106A (e.g., a vibrator 106A) and a haptic device controller 106B (e.g., a vibrator controller 106) coupled with the haptic device 106A (e.g., vibrator 106A) to control operation of the haptic device 106A (e.g. control operation of the vibrator 106A.) The battery operated wearable device 102 can also include a processor. The processor of the battery operated wearable device 102 can include an interrupt to save system state of the battery operated wearable device 102. The battery operated wearable device 102 can also include additional components not shown in FIG. 1.

The example system 100 can include a battery 108 and a current controller apparatus (e.g., current controller 110) to prevent injury from the battery operated wearable device 102. Such wearable device can be a wrist wearable device or a head wearable device. As mentioned previously, wearable devices such as wrist wearable devices, head wearable devices and/or the like can come in close contact with users.

As a head wearable system, the example system 100 can avoid thermal injury damage due to overcurrent. As a wrist wearable system, the example system can avoid thermal wrist injury due to overcurrent.

As shown in the example of FIG. 1, example current controller 110 can include example battery couplers 112A, 112B, example sense resistor 114, example current sense amplifier 116, example integrator 118, example comparator 120, example control logic 122 and example isolation switch 124. The battery couplers 112A, 112B can couple current of the battery 108, for example, into battery operated wearable device 102. The sense resistor 114 can be in circuit with the battery couplers 112A, 112B to generate a voltage from the current of the battery 108. The current sense amplifier 116 can sense the voltage of the sense resistor at differential inputs 116A, 116B of the current sense amplifier 116. The integrator 118 can be in circuit with an output 116C of the current sense amplifier to integrate the output 116C of the current sense amplifier 116 and to generate an integrator output 118A.

The control logic 122 can generate an overcurrent threshold reference 122A. The comparator 120 can compare the overcurrent threshold reference 122A and the integrator output 118A to generate an overcurrent indicator 120A. For example, the comparator 120 can determine whether the integrator output 118A satisfies the overcurrent threshold reference 122A. For example, the comparator 120 can determine that the integrator output 118A satisfies the overcurrent threshold reference 122A when the integrator output 118A at least meets or exceeds the overcurrent threshold reference 122A. When the comparator 120 determines that the integrator output 118A satisfies the overcurrent threshold reference 122A, the comparator 120 can generate the overcurrent indicator 120A to trigger an overcurrent fault status. For example, a low to high transition can be generated for the overcurrent indicator, when the comparator 120 determines that the integrator output 118A satisfies the overcurrent threshold reference 122A, so as to trigger the overcurrent fault status.

The control logic 122 can generate an isolation switch control signal 122B in response to the overcurrent indicator 120A. For example, the control logic 122 can generate the isolation switch control signal 122B in response to the overcurrent fault status of the overcurrent indicator 120A. The isolation switch 124 can interrupt delivery of the current of the battery 108 to a load (e.g., LED 104A, e.g., haptic device 106A) in response to the isolation switch control signal 122B to prevent burn injury to a wearer of the battery operated wearable device 102. The isolation switch 124 can include an isolation field effect transistor (FET) 124, as shown in the example of FIG. 1.

The control logic 122 can also generate an integrator reset control signal 122C. The integrator reset control signal 122C can be periodic, to reset the integrator on a periodic basis. The integrator 118 can include an integrator reset switch 126, to reset the integrator (e.g., periodically) in response to the (e.g., periodic) integrator reset control signal 122C. For example, the comparator 120 can determine that the integrator output 118A does not satisfy the overcurrent threshold reference 122A, when the integrator output 118A does not at least meet or exceed the overcurrent threshold reference 122A. When the comparator 120 determines that the integrator output 118A does not satisfy the overcurrent threshold reference 122A, the comparator 120 does not trigger the overcurrent fault status for the overcurrent indicator 120A. For example, when the comparator 120 determines that the integrator output 118A does not satisfy the overcurrent threshold reference 122A, the comparator 120 does not generate the low to high transition for the overcurrent indicator 120A.

The control logic 122 can monitor for the overcurrent indicator 120A for triggering the overcurrent fault status. When the integrator output 118 does not satisfy the overcurrent threshold reference 122A, and the comparator 120 does not trigger the overcurrent fault status for the overcurrent indicator 120A, based on its monitoring of the overcurrent indicator 120A, the control logic 122 can generate the integrator reset control signal 122C.

The control logic 122 can also generate a save system state control signal 128 in response to the overcurrent fault status of the overcurrent indicator 120A. For example, when there is an overcurrent fault, the control logic 122 can respond by generating the save system state control signal 128 The processor of the battery operated wearable device 102 can include the interrupt to save system state of the battery operated wearable device 102. The interrupt can be processed by the processor to save system state of the battery operated wearable device 102 in response to the save system state control signal 128. A delay period of time (e.g., 500 milliseconds) can provide the processor with sufficient time to save system state of the battery operated wearable device 102 in non-volatile memory, in response to the save system state control signal 128. This delay period of time can be designated as a save system state period of time. For example, prior to interrupting delivery of the current of the battery to the processor, the delay period (e.g., 500 milliseconds) can provide the processor with sufficient time to save system state of the battery operated wearable device 102. For example, a delay of the delay period (e.g., 500 milliseconds) can pass between a first time when the overcurrent indicator 120A indicates an overcurrent of the battery current and a second time when the isolation switch control signal 122B is to activate the isolation switch 124 to interrupt delivery of the current of the battery to the load (e.g., the processor in addition to other components, e.g., LED 104A, e.g., haptic device 106A.) Prior to being activated, the inactivated isolation switch 124 can be in a conducting state, so as to conduct the battery current. However, upon being activated, the isolation switch 124 can be in a non-conducting state, so as to interrupt the battery current. The control logic can include a delay timer 130 to generate the delay of the delay period of time (e.g., the delay of the save system state period of time.) For example, the delay timer 130 can generate the delay of the delay period (e.g., 500 milliseconds) to enable the processor to save system state of the battery operated wearable device 102 in non-volatile memory, prior to the isolation switch 124 interrupting delivery of the current of the battery. Of interest, the system of FIG. 1 can prevent thermal injury without the use of a temperature sensor, thermistor or the like. As such, it may reduce costs and part counts relative to temperature sensing devices, and is not susceptible to defects associated with failure of such temperature sensing equipment.

Of further interest are possible advantages of the circuitry used to implement the components of FIG. 1 (e.g., the example LED controller 104B, example haptic device controller 106B, example integrator 118, example comparator 120, example control logic 122, example integrator reset switch 126 and example delay timer 130), relative to alternative implementations using software or firmware executing on a processor. For example, relative to alternative implementations using software or firmware executing on a processor, circuitry used to implement the components of FIG. 1 may provide for more modular design, may provide for greater reliability, may consume less power and/or may provide greater performance in protecting against thermal injury, which may otherwise be caused by the overcurrent event.

Figure 2:
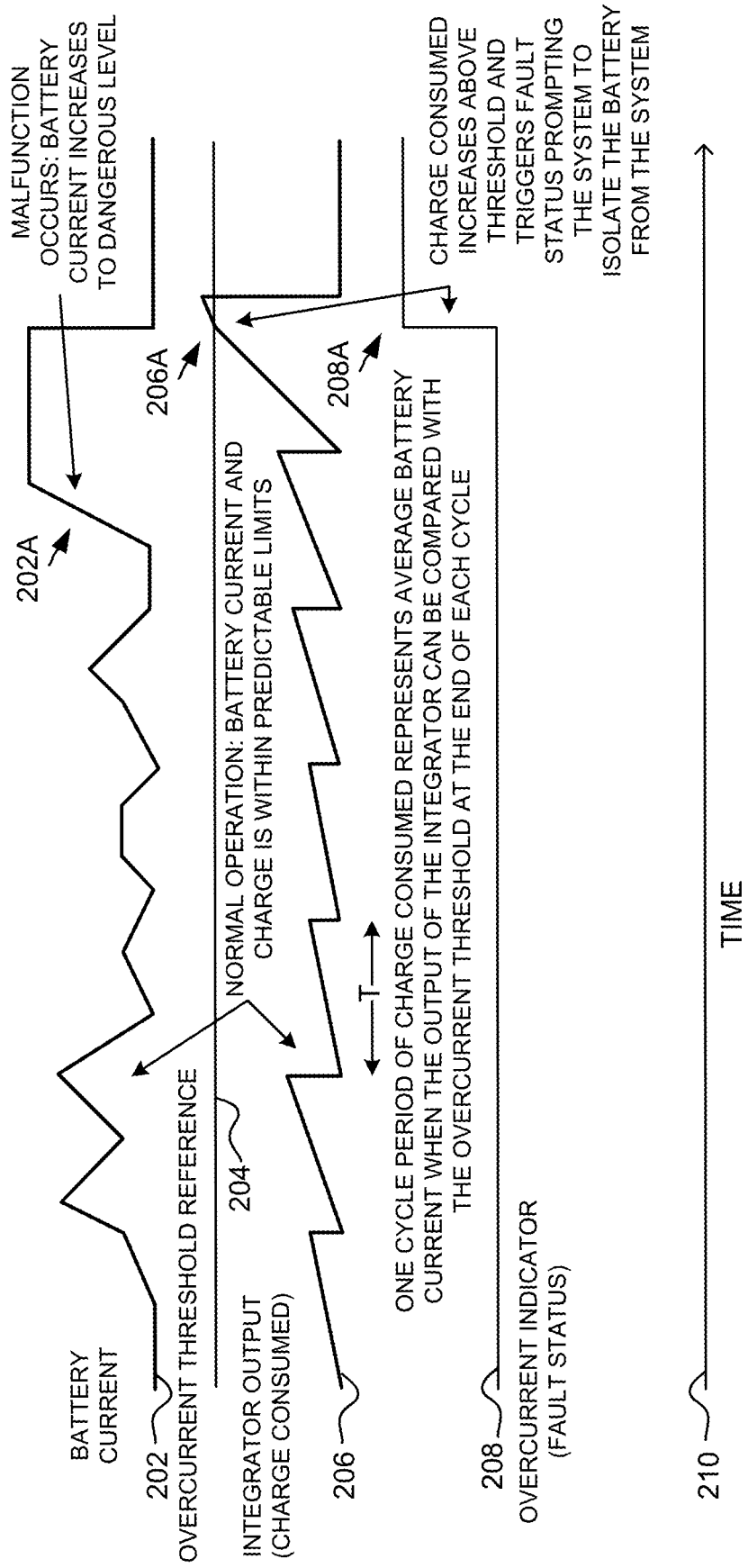
FIG. 2 is a timing diagram illustrating operation of the example battery current monitoring system in the wearable device shown in FIG. 1.

FIG. 2 is a timing diagram illustrating operation of the example battery current monitoring system in the wearable device shown in FIG. 1. The example of FIG. 2 shows a battery current trace 202, an overcurrent threshold reference 204, an integrator output trace 206 and an overcurrent indicator trace 208, all relative to the same time axis 210.

The battery current trace 202 shows battery current varying over time, relative to the time axis 210, within safe limits prior to a malfunction portion 202A of the current trace 202. The malfunction portion 202A of the current trace 202 representatively illustrates occurrence of a malfunction in the wearable device, in which battery current increases to a dangerous level (i.e. an overcurrent situation that could generate heat, which may lead to injury without intervention.)

The integrator output trace 206 is indicative of charge consumed by the wearable device from the battery current. The integrator can include the reset switch as discussed previously herein, to reset the integrator (e.g., periodically) in response to the (e.g., periodic) integrator reset control signal. As shown in the example of FIG. 2, for the integrator output trace 206, one example cycle period T extends between consecutive resets of the integrator. Accordingly, after a reset occurs at the beginning of example cycle period T, the integrator output trace 206 is shown in FIG. 2 as ramping up until dropping when a subsequent reset occurs at the end of example cycle period T. In the example of FIG. 2, one example period of charge consumed represents average battery current, when the output of the integrator can be compared with the overcurrent threshold reference 204.

In response to occurrence of the malfunction in the wearable device (representatively illustrated by malfunction portion 202A of the current trace 202), FIG. 2 shows a point 206A, when the integrator output trace 206 crosses and/or exceeds the overcurrent threshold reference 204. The example of FIG. 2 shows a low to high transition 208A in the overcurrent indicator trace 208, in response to the integrator output trace 206 crossing and/or exceeding the overcurrent threshold reference 204. This representatively illustrates charge consumed by the wearable device from the battery current increasing above the overcurrent threshold, and triggering an overcurrent fault status. This can prompt the system to isolate the battery from the system. For example, the isolation switch control signal can be generated in response to the low to high transition 208A in the overcurrent trace 208. As discussed previously herein, the isolation switch 124 can interrupt delivery of the current of the battery to the load in response to the isolation switch control signal, so as to prevent burn injury to a wearer of the battery operated wearable device.

While example manners of implementing and using the example system 100 for battery current monitoring in the battery operated wearable device 102 of FIGS. 1 and 2 are illustrated in FIGS. 1 and 2, one or more of the elements, processes and/or devices illustrated in FIGS. 1 and 2 may be combined, divided, re-arranged, omitted, eliminated, and/or implemented in any other way. Further, the example system 100 for battery current monitoring, example battery operated wearable device 102, example LED controller 104B, example haptic device controller 106B, example current controller 110, example integrator 118, example integrator output 118A, example comparator 120, example overcurrent indicator 120A, example control logic 122, example overcurrent threshold reference 122A, example isolation switch control signal 122B, example integrator reset control signal 122C, example isolation switch 124, example integrator reset switch 126 and example save system state control signal 128 may be implemented by hardware, software, firmware and/or any combination of hardware, software and/or firmware.

Thus, for example, any of the example system 100 for battery current monitoring, example battery operated wearable device 102, example LED controller 104B, example haptic device controller 106B, example current controller 110, example integrator 118, example integrator output 118A, example comparator 120, example overcurrent indicator 120A, example control logic 122, example overcurrent threshold reference 122A, example isolation switch control signal 122B, example integrator reset control signal 122C, example isolation switch 124, example integrator reset switch 126 and example save system state control signal 128 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example system 100 for battery current monitoring, example battery operated wearable device 102, example LED controller 104B, example haptic device controller 106B, example current controller 110, example integrator 118, example integrator output 118A, example comparator 120, example overcurrent indicator 120A, example control logic 122, example overcurrent threshold reference 122A, example isolation switch control signal 122B, example integrator reset control signal 122C, example integrator reset switch 126 and example save system state control signal 128 is/are hereby expressly defined to include a tangible computer readable storage device or storage disk such as a memory, a digital versatile disk (DVD), a compact disk (CD), a Blu-ray disk, etc. storing the software and/or firmware. Further still, example system 100 for battery current monitoring, example battery operated wearable device 102, example LED 104A, example LED controller 104B, example haptic device 106A, example haptic device controller 106B, example battery 108, example current controller 110, example battery couplers 112A, 112B, example sense resistor 114, example current sense amplifier 116, example differential inputs 116A, 116B of the current sense amplifier 116, example output 116C of the current sense amplifier, example integrator 118, example integrator output 118A, example comparator 120, example overcurrent indicator 120A, example control logic 122, example overcurrent threshold reference 122A, example isolation switch control signal 122B, example integrator reset control signal 122C, example isolation switch 124, example integrator reset switch 126 and example save system state control signal 128 may include more than one of any or all of the illustrated elements, processes and devices.

Figure 3:
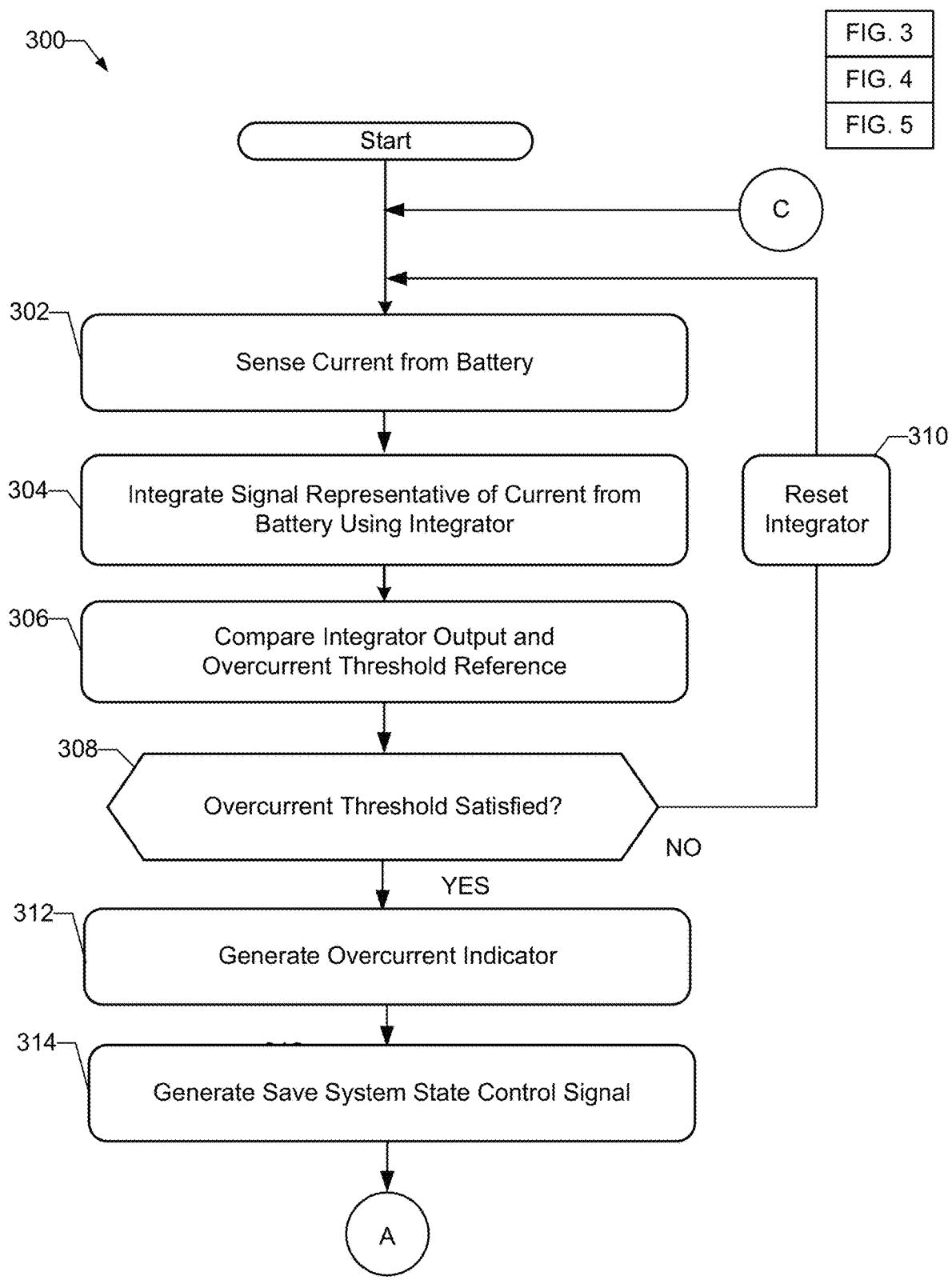
FIGS. 3-5 are a flowchart representative of example of machine readable instructions which may be executed to implement the example system for battery current monitoring in the wearable device of FIGS. 1 and 2.
Figure 4:
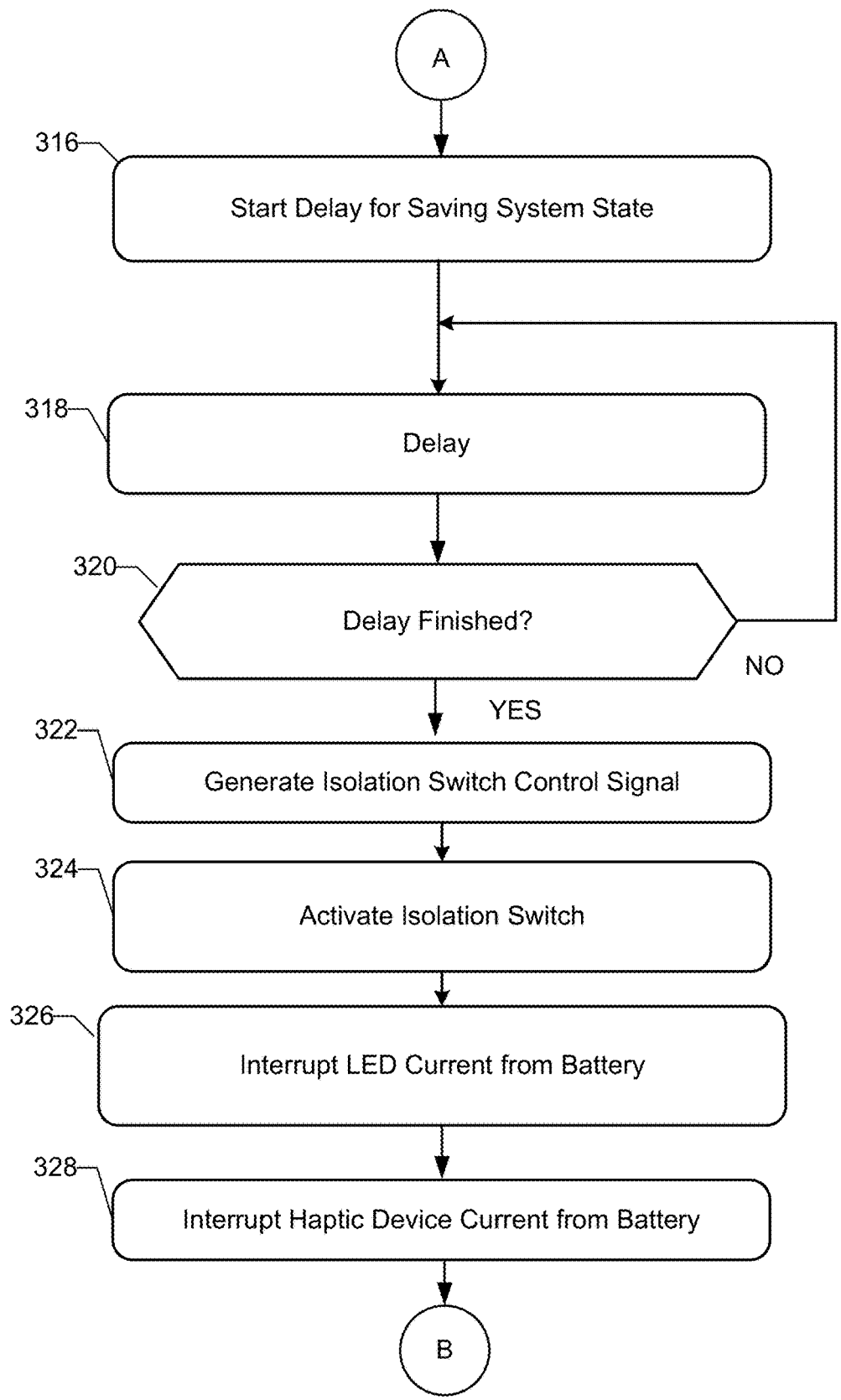
Figure 5:
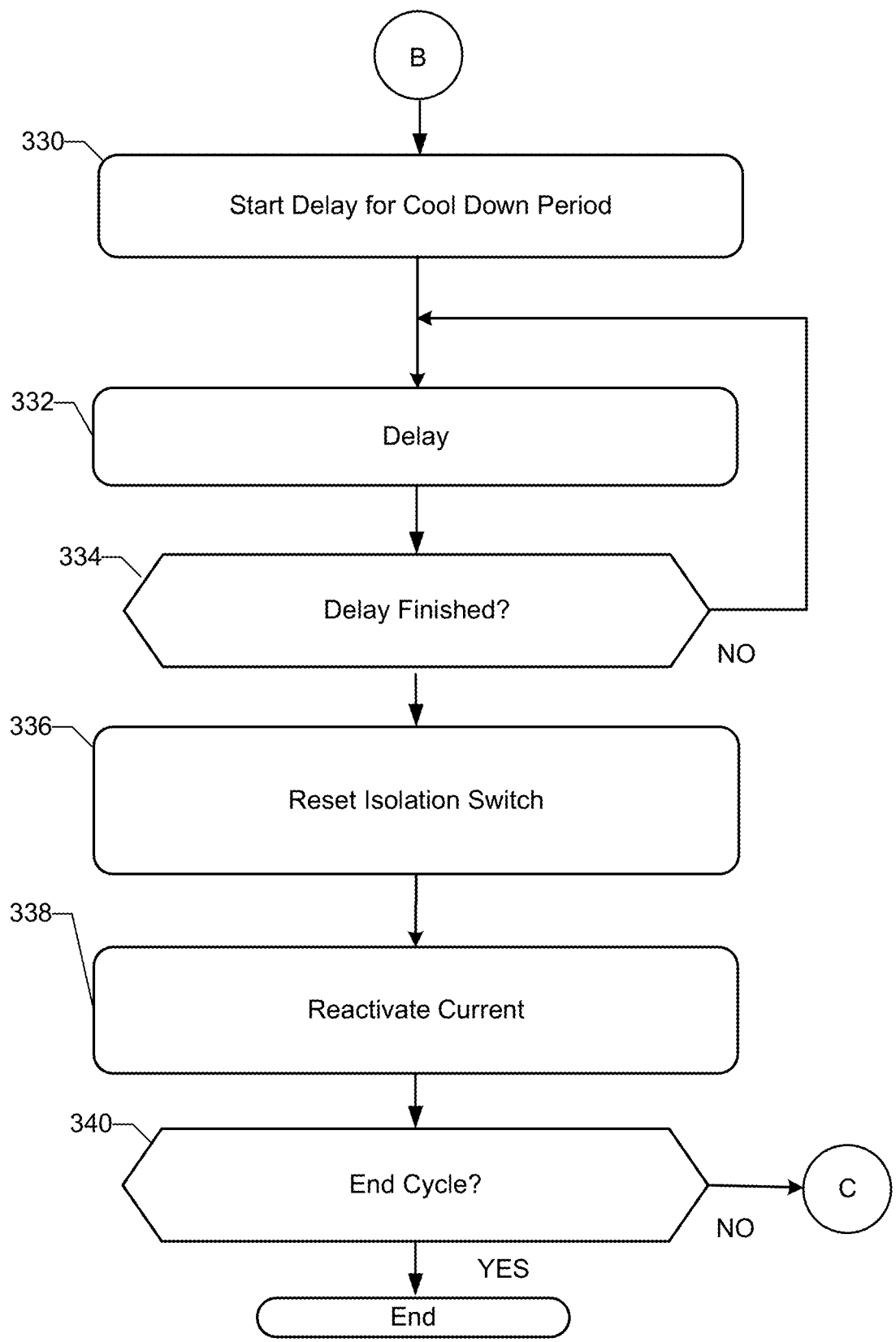

FIGS. 3-5 are a flowchart representative of example machine readable instructions which may be executed to implement the example system for battery current monitoring in the wearable device of FIGS. 1 and 2. In this example, the machine readable instructions correspond to a program for execution by a processor such as the processor 612 shown in the example processor platform 600 discussed below in connection with FIG. 6. The program may be embodied in software stored on a non-transitory computer readable medium and/or a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIGS. 3-5, many other methods of the example system for battery current monitoring in the wearable device may alternatively be used. For example, the order of execution of the blocks may be changed, and/or some of the blocks described may be changed, eliminated, or combined.

The method 300 to prevent thermal injury in a wearable device shown in the example of FIGS. 3-5 begins at block 302. At block 302, current from a battery can be sensed. For example, as shown in the example of FIG. 1, the battery couplers 112A, 112B can couple current of the battery 108, for example, into battery operated wearable device 102. The sense resistor 114 can be in circuit with the battery couplers 112A, 112B to generate a voltage from the current of the battery 108. The current sense amplifier 116 can sense the voltage of the sense resistor at differential inputs 116A, 116B of the current sense amplifier 116.

Next, at block 304 of the example of FIG. 3, a signal representative of the current from the battery can be integrated using an integrator to generate an integrator output. For example, as shown in the example of FIG. 1, the integrator 118 can be in circuit with an output 116C of the current sense amplifier to integrate the output 116C of the current sense amplifier 116 and to generate an integrator output 118A.

Next, at block 306 of the example of FIG. 3, the integrator output and an overcurrent threshold reference can be compared. For example, as shown in the example of FIG. 1, the comparator 120 can compare the overcurrent threshold reference 122A and the integrator output 118A. For example, the comparator 120 can determine whether the integrator output 118A satisfies the overcurrent threshold reference 122A.

Next, at decision block 308 of the example of FIG. 3, it is determined whether the integrator output satisfies the overcurrent threshold reference. For example, if it is determined that the integrator output does not satisfy the overcurrent threshold reference, then at block 310 the integrator can be reset, and flow of execution of method 300 can be transferred to block 302. For example, if it is determined that the integrator output does not satisfy the overcurrent threshold reference, monitoring can continue, then at block 310 the integrator can be reset based on a periodic signal, which can be generated by the control logic. For example, as shown in the example of FIG. 1, the comparator 120 can determine that the integrator output 118A does not satisfy the overcurrent threshold reference 122A, when the integrator output 118A does not at least meet or exceed the overcurrent threshold reference 122A. When the comparator 120 determines that the integrator output 118A does not satisfy the overcurrent threshold reference 122A, the comparator 120 does not trigger an overcurrent fault status for the overcurrent indicator 120A. For example, when the comparator 120 determines that the integrator output 118A does not satisfy the overcurrent threshold reference 122A, the comparator 120 does not generate the low to high transition for the overcurrent indicator 120A.

The control logic 122 can monitor for the overcurrent indicator 120A for triggering of the overcurrent fault status. When the integrator output 118 does not satisfy the overcurrent threshold reference 122A, and the comparator 120 does not trigger the overcurrent fault status for the overcurrent indicator 120A, based on its monitoring of the overcurrent indicator 120A, the control logic 122 can generate the integrator reset control signal 122C. The integrator reset control signal 122C can be periodic, to reset the integrator on a periodic basis. The integrator 118 can include an integrator reset switch 126, to reset the integrator (e.g., periodically) in response to the (e.g., periodic) integrator reset control signal 122C.

In the example of FIG. 3, at decision block 308, if it is determined that the integrator output does satisfy the overcurrent threshold reference, then flow of execution of method 300 can continue to block 312. At block 312 the overcurrent indicator can be generated. For example, when the integrator output satisfies the overcurrent threshold reference, the overcurrent indicator can be generated to trigger the overcurrent fault status. For example, as shown in the example of FIG. 1, the comparator 120 can compare the overcurrent threshold reference 122A and the integrator output 118A to generate the overcurrent indicator 120A. For example, the comparator 120 can determine whether the integrator output 118A satisfies the overcurrent threshold reference 122A. For example, the comparator 120 can determine that the integrator output 118A satisfies the overcurrent threshold reference 122A when the integrator output 118A at least meets or exceeds the overcurrent threshold reference 122A. When the comparator 120 determines that the integrator output 118A satisfies the overcurrent threshold reference 122A, the comparator 120 can generate the overcurrent indicator 120A to trigger the overcurrent fault status. For example, the low to high transition can be generated for the overcurrent indicator, when the comparator 120 determines that the integrator output 118A satisfies the overcurrent threshold reference 122A, so as to trigger the overcurrent fault status.

Next, at block 314 in the example of FIG. 3, a save system state control signal can be generated in response to the overcurrent indicator. For example, when the overcurrent indicator triggers the overcurrent fault status, the system state control signal can be generated in response. For example, as shown in the example of FIG. 1, the control logic 122 can generate the save system state control signal 128 in response to the overcurrent fault status of the overcurrent indicator 120A. For example, when there is an overcurrent fault, the control logic 122 can respond by generating the save system state control signal 128 The processor of the battery operated wearable device 102 can include the interrupt to save system state of the battery operated wearable device 102. The interrupt can be processed by the processor to save system state of the battery operated wearable device 102 in response to the save system state control signal 128.

Next, at block 316 in the example of FIG. 4, a delay can be started for saving system state. At block 318 there can be a delay for a save system state period of time after generating the save system state control signal. At decision block 320 it can be determined when the delaying for the save system state period of time is finished. If it is determined that the delaying for the save system state period of time is not finished, then flow of execution of method 300 can be transferred to block 318 for delay. However, if it is determined that the delaying for the save system state period of time is finished, then flow of execution of method 300 can continue to block 322 to generate the isolation switch control signal.

For example, as shown in the example of FIG. 1, a delay period of time (e.g., 500 milliseconds) can provide the processor with sufficient time to save system state of the battery operated wearable device 102 in non-volatile memory, in response to the save system state control signal 128. This delay period of time can be designated as the save system state period of time. For example, prior to interrupting delivery of the current of the battery to the processor, the delay period (e.g., 500 milliseconds) can provide the processor with sufficient time to save system state of the battery operated wearable device 102. For example, a delay of the delay period (e.g., 500 milliseconds) can pass between a first time when the overcurrent indicator 120A indicates an overcurrent of the battery current and a second time when the isolation switch control signal 122B is to activate the isolation switch 124 to interrupt delivery of the current of the battery to the load (e.g., the processor in addition to other components, e.g., LED 104A, e.g., haptic device 106A.) The control logic can include a delay timer 130 to generate the delay of the delay period of time (e.g., the delay of the save system state period of time.) For example, the delay timer 130 can generate the delay of the delay period (e.g., 500 milliseconds) to provide the processor with sufficient time to save system state of the battery operated wearable device 102 in non-volatile memory, prior to the isolation switch 124 interrupting delivery of the current of the battery.

Next, at block 322 in the example of FIG. 4, the isolation switch control signal can be generated. For example, the isolation switch control signal can be generated in response to the overcurrent indicator (e.g., in response to the overcurrent fault status of the overcurrent indicator.) For example, the isolation switch control signal can be generated in response to the overcurrent indicator after delaying for the save system state period of time. Next at block 324, the isolation switch can be activated to interrupt the battery current in response to the isolation switch control signal. Next at block 326, LED current from the battery can be interrupted. Next at block 328, haptic device current from the battery can be interrupted.

For example, as shown in the example of FIG. 1, the control logic 122 can generate the isolation switch control signal 122B in response to the overcurrent indicator 120A. For example, the control logic 122 can generate the isolation switch control signal 122B in response to the overcurrent fault status of the overcurrent indicator 120A. The isolation switch 124 can be activated interrupt delivery of the current of the battery 108 to the load (e.g., LED 104A, e.g., haptic device 106A) in response to the isolation switch control signal 122B to prevent burn injury to a wearer of the battery operated wearable device 102. Prior to being activated, the inactivated isolation switch 124 can be in a conducting state, so as to conduct the battery current. However, upon being activated, the isolation switch 124 can be in a non-conducting state, so as to interrupt the battery current. The isolation switch 124 can include an isolation field effect transistor (FET) 124, as shown in the example of FIG. 1.

Next, at block 330 in the example of FIG. 5, a delay can be started for a cool down period of time, after interrupting the battery current. At block 332 there can be a delay for a cool down period of time after interrupting the battery current. For example, after the overcurrent fault of the battery operated wearable device, and after the interrupting of battery current, a cool down period of time can let the battery operated wearable device cool down from a first temperature (e.g., higher temperature) associated with the overcurrent fault to a second temperature that is lower than the first temperature. At decision block 334 it can be determined when the delaying for the cool down period of time is finished. If it is determined that the delaying for the cool down period of time is not finished, then flow of execution of method 300 can be transferred to block 332 for delay. However, if it is determined that the delaying for the cool down period of time is finished, then flow of execution of method 300 can continue to block 336 to generate reset the isolation switch. For example, delay timer 130 of control logic 122 shown in the example of FIG. 1 can be used to start the cool down period of time, after interrupting the battery current, and to determine when the cool down period of time is finished.

Next, at block 336 in the example of FIG. 5, the isolation switch can be reset. At block 338, battery current can be reactivated (e.g., current from the battery can once again be conducted for operation of the battery operated device.) For example, while the isolation switch was activated, the isolation switch could be in the non-conducting state, so as to interrupt the battery current. However, upon the isolation switch being reset, the isolation switch can be inactivated. Upon being reset, the inactivated isolation switch 124 can be in the conducting state, so as to conduct the battery current once again. For example, after the delay timer 130 of control logic 122 determines that the cool down period of time is finished, control logic 122 shown in the example of FIG. 1 can use the isolation switch control signal 122B to reset the isolation switch 124 (e.g., to inactivate the isolation switch 124 so as to be in the conducting state once again.)

Next, at decision block 340 in the example of FIG. 5, it is determined whether to end the cycle of preventing thermal injury in the wearable device. For example, if a control input registered at a time determines that the cycle is not to end at that time, then flow execution transfers to block 302 shown in FIG. 3. However, if a control input registered at that time determines that the cycle is to end at that time, then after block 340, the method 300 to prevent thermal injury in the wearable device can end.

As mentioned above, the example processes of FIGS. 3-5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 6:
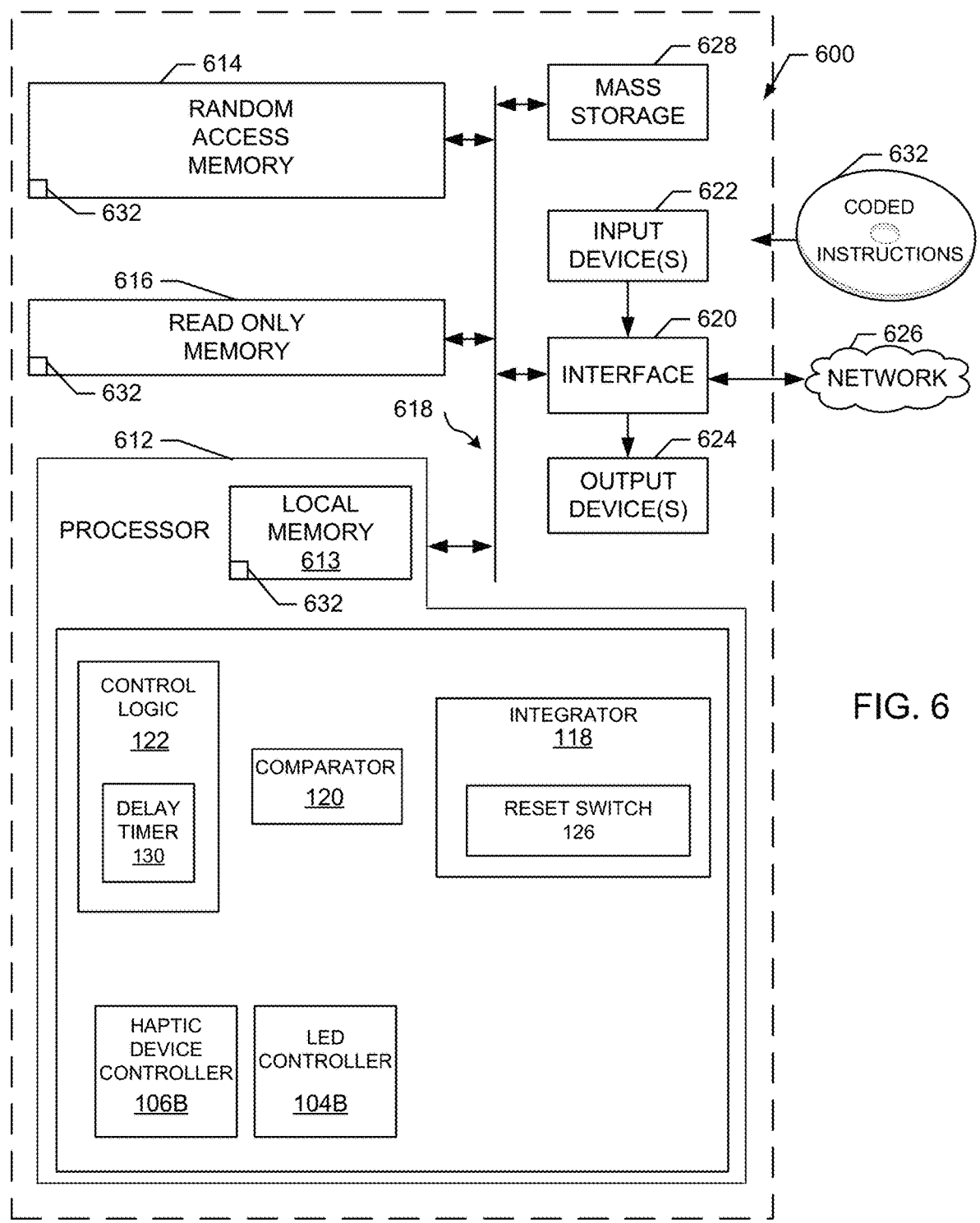
FIG. 6 is a block diagram of an example processing platform capable of executing the example machine-readable instructions of the flowchart of FIGS. 3-5 to implement the example system for battery current monitoring in the wearable device of FIGS. 1 and 2.

FIG. 6 is a block diagram of an example processing platform capable of executing the example machine-readable instructions of the flowchart of FIGS. 3-5 to implement the example system for battery current monitoring in the wearable device of FIGS. 1 and 2. The processor platform 600 can be implemented in a wearable (e.g., wrist wearable or head wearable) device. Alternatively or additionally, processor platform 600 can be can be, for example, a personal computer, a mobile device (e.g., a cell phone, a smart phone, a tablet such as an iPad™), a personal digital assistant (PDA), an Internet appliance, a DVD player, a CD player, a Blu-ray player, a gaming console, a personal video recorder, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. The hardware of processor 612 can be virtualized using virtualization such as Virtual Machines (VM's) and/or containers. The processor 612 can implement aspects of example LED controller 104B, example haptic device controller 106B, example integrator 118, example comparator 120, example control logic 122, example integrator reset switch 126 and example delay timer 130.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device (s) 622 permit(s) a user to enter data and commands into the processor 612. The input device(s) can be implemented by, for example, an audio sensor, a microphone, a camera (e.g. video camera), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by a haptic device, by a vibrator, by display devices (e.g., a head mounted display, head wearable display, wrist wearable display, a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIGS. 3-5 may be stored in the mass storage device 628, in the volatile memory 614, in the non-volatile memory 616, and/or on a removable tangible computer readable storage medium such as a CD or DVD.

Although FIG. 6 illustrates a processor based implementation of the circuit of FIG. 1, in some implementations digital or analog circuitry is used instead of a processor to implement the components of FIG. 1 (e.g., the example LED controller 104B, example haptic device controller 106B, example integrator 118, example comparator 120, example control logic 122, example integrator reset switch 126 and example delay timer 130.) In such implementation, the method of FIGS. 3-5 is instituted in the circuitry and no program is needed to protect against thermal injury and which may otherwise be caused by the overcurrent event.

Example 1 is a method of preventing thermal injury in a wearable device, the method comprising, sensing current from a battery, integrating a signal representative of the current from the battery using an integrator to generate an integrator output, comparing the integrator output and an overcurrent threshold reference, generating an overcurrent indicator when the integrator output satisfies the overcurrent threshold reference, and interrupting the current from the battery in response to the overcurrent indicator to prevent the thermal injury.

Example 2 includes the method as in example 1, including delaying for a cool down period after the interrupting of the current from the battery.

Example 3 includes the method as in example 1 including generating a save system state control signal in response to the overcurrent indicator.

Example 4 includes the method as in example 3 including delaying for a save system state period after generating the save system state control signal, and determining when the delaying for the save system state period is finished, in which the interrupting of the current includes interrupting the current after the save system state period is finished.

Example 5 includes the method as in one of examples 1-4 in which the interrupting of the current includes generating an isolation switch control signal in response to the overcurrent indicator.

Example 6 includes the method as in example 5 in which the interrupting of the current includes activating an isolation switch in response to the isolation switch control signal.

Example 7 includes the method as in one of examples 1-4 including generating an integrator reset control signal.

Example 8 includes the method as in one of examples 1-4 including resetting an integrator in response to an integrator reset control signal.

Example 9 includes the method as in one of examples 1-4 including resetting an isolation switch after interrupting the current from the battery.

Example 10 is an apparatus comprising means to perform a method as in any preceding example.

Example 11 is machine-readable storage including machine-readable instructions, when executed, to implement a method or realize an apparatus as in any preceding example.

Example 12 is a current controller to prevent injury from a battery operated wearable device comprising, a battery coupler to couple current of a battery, a sense resistor in circuit with the battery coupler to generate a voltage from the current of the battery, a current sense amplifier to sense the voltage of the sense resistor, an integrator in circuit with an output of the current sense amplifier to integrate the output of the current sense amplifier and to generate an integrator output, a comparator to compare an overcurrent threshold reference and the integrator output to generate an overcurrent indicator, control logic to generate an isolation switch control signal in response to the overcurrent indicator, and an isolation switch to interrupt delivery of the current of the battery to a load in response to the isolation switch control signal to prevent burn injury to a wearer of the battery operated wearable device.

Example 13 includes the current controller as in example 12 in which the isolation switch includes a field effect transistor.

Example 14 includes the current controller as in example 12 in which the battery operated wearable device is wrist wearable or head wearable.

Example 15 includes the current controller as in example 12 in which the control logic is to generate the overcurrent threshold reference.

Example 16 includes the current controller as in one of examples 12-15 in which the control logic is to generate an integrator reset control signal.

Example 17 includes the current controller as in example 16 in which the integrator includes a reset switch to reset the integrator in response to the integrator reset control signal.

Example 18 includes the current controller as in example 16 in which the control logic is to generate a save system state control signal in response to the overcurrent indicator.

Example 19 is a head wearable system to avoid thermal head injury due to overcurrent, the system comprising, a battery, a sense resistor to generate a voltage from a current of the battery, a current sense amplifier having inputs in circuit with the sense resistor to sense the voltage of the sense resistor, an integrator in circuit with an output of the current sense amplifier to integrate the output of the current sense amplifier and to generate an integrator output, a reset switch to reset the integrator, a comparator to compare an overcurrent threshold reference and the integrator output to generate an overcurrent indicator, and an isolation switch to interrupt the current of the battery based on the overcurrent indicator to avoid the thermal head injury.

Example 20 includes the head wearable system as in example 19 in which the isolation switch includes a field effect transistor.

Example 21 includes the head wearable system as in example 19 including a light emitting diode in which the isolation switch is to interrupt an overcurrent through the light emitting diode.

Example 22 includes the head wearable system as in example 19 including a haptic device in which the isolation switch is to interrupt an overcurrent through the haptic device.

Example 23 includes the head wearable system as in one of examples 19-22 including control logic to generate a save system state control signal in response to the overcurrent indicator.

Example 24 includes the head wearable system as in example 23 in which the control logic includes a delay timer to delay for a save system state period after the control logic generates the save system state control signal.

Example 25 includes the head wearable system as in example 24 in which the isolation switch is to interrupt the current of the battery after the delay timer delays for the save system state period.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A current controller to prevent injury from a battery operated head wearable device, the current controller comprising:
   a haptic device;
   an isolation switch to deliver power from a battery to the haptic device;
   a sense resistor in circuit with the battery and the isolation switch, the sense resistor to generate a voltage based on current from the battery to the haptic device;
   a current sense amplifier in circuit with the sense resistor, the current sense amplifier to sense the voltage;
   an integrator in circuit with an output of the current sense amplifier, the integrator to integrate the output to generate an integrator output;
   a comparator in circuit with the integrator, the comparator to compare an overcurrent threshold reference and the integrator output to generate an overcurrent indicator; and
   control logic in circuit with the comparator and the isolation switch, the control logic to generate an isolation switch control signal in response to the overcurrent indicator to cause the isolation switch to interrupt delivery of the current from the battery to the haptic device to prevent burn injury to a wearer of the battery operated head wearable device.

2. The current controller of claim 1, wherein the isolation switch includes a field effect transistor.

3. The current controller of claim 1, wherein the battery operated wearable head device is a head mounted display.

4. The current controller of claim 1, wherein the control logic is to generate the overcurrent threshold reference.

5. The current controller of claim 1, wherein the control logic is to generate an integrator reset control signal in response to the integrator output not satisfying the overcurrent threshold reference.

6. The current controller of claim 5, wherein the integrator includes a reset switch to reset the integrator in response to the integrator reset control signal.

7. The current controller of claim 1, wherein the control logic is to generate a save system state control signal in response to the overcurrent indicator.

8. A method of preventing thermal injury in a head wearable device, the method comprising:
   sensing current from a battery to a haptic device;
   integrating a signal representative of the current to generate an integrator output;
   comparing the integrator output and an overcurrent threshold reference;
   generating an overcurrent indicator in response to the integrator output satisfying the overcurrent threshold reference; and
   in response to the overcurrent indicator, interrupting the current from the battery to the haptic device to prevent the thermal injury associated with the head wearable device.

9. The method of claim 8, further including initiating a cool down period after the interrupting of the current from the battery to the haptic device.

10. The method of claim 8, further including generating a save system state control signal in response to the overcurrent indicator.

11. The method of claim 10, further including initiating a save system state period after generating the save system state control signal, the interrupting of the current to occur in response to determining that the save system state period is finished.

12. The method of claim 8, further including generating an isolation switch control signal in response to the overcurrent indicator.

13. The method of claim 12, further including activating an isolation switch to interrupt the current from the battery to the haptic device in response to the isolation switch control signal.

14. A head wearable system to avoid thermal head injury due to overcurrent, the head wearable system comprising:
   a haptic device;
   an isolation switch to deliver power from a battery to the haptic device;
   a sense resistor to generate a voltage based on a current from the battery to the haptic device;
   a current sense amplifier having inputs in circuit with the sense resistor, the current sense amplifier to sense the voltage;
   an integrator in circuit with an output of the current sense amplifier, the integrator to integrate the output of the current sense amplifier to generate an integrator output, the integrator including a reset switch to reset the integrator;
   a comparator to compare an overcurrent threshold reference and the integrator output to generate an overcurrent indicator based on the comparison; and
   control logic to cause the isolation switch to interrupt the current from the battery to the haptic device based on the overcurrent indicator to avoid the thermal head injury.

15. The head wearable system of claim 14, wherein the isolation switch includes a field effect transistor.

16. The head wearable system of claim 14, further including a light emitting diode in circuit with the isolation switch, the isolation switch to interrupt current from the battery to the light emitting diode in response to the overcurrent indicator.

17. The head wearable system of claim 14, wherein the control logic is to generate a save system state control signal in response to the overcurrent indicator.

18. The head wearable system of claim 17, wherein the control logic includes a delay timer to define a save system state period after the save system state control signal is generated.

19. The head wearable system of claim 18, wherein the isolation switch is to interrupt the current from the battery to the haptic device after the save system state period.

20. The head wearable system of claim 14, wherein the reset switch is to reset the integrator in response to the comparator determining that the integrator output does not satisfy the overcurrent threshold reference.

* * * * *